US011506157B2

(12) United States Patent
Liu et al.

(10) Patent No.: US 11,506,157 B2
(45) Date of Patent: Nov. 22, 2022

(54) MULTI-LIPPED GASKET FOR AN AIR INTAKE ASSEMBLY

(71) Applicant: Resource Intl Inc., New Castle, DE (US)

(72) Inventors: Ye Liu, Elkton, MD (US); Kevin McCardle, Philadelphia, PA (US)

(73) Assignee: Resource Intl Inc., New Castle, DE (US)

( * ) Notice: Subject to any disclaimer, the term of this patent is extended or adjusted under 35 U.S.C. 154(b) by 51 days.

(21) Appl. No.: 17/217,414

(22) Filed: Mar. 30, 2021

(65) Prior Publication Data

US 2022/0316432 A1 Oct. 6, 2022

(51) Int. Cl.

| | |
|---|---|
| ***F02M 35/10*** | (2006.01) |
| ***F16J 15/3232*** | (2016.01) |
| ***F02M 35/02*** | (2006.01) |
| ***F02M 35/024*** | (2006.01) |

(52) U.S. Cl.

CPC .. *F02M 35/10144* (2013.01); *F02M 35/0203* (2013.01); *F02M 35/0204* (2013.01); *F02M 35/02416* (2013.01); *F02M 35/02483* (2013.01)

(58) Field of Classification Search

CPC ....... F02M 35/10091; F02M 35/10144; F02M 35/0203; F02M 35/0204; F02M 35/02416; F02M 35/02483; F16J 15/02; F16J 15/3232

See application file for complete search history.

(56) References Cited

U.S. PATENT DOCUMENTS

| | | | | |
|---|---|---|---|---|
| 8,337,579 B2 * | 12/2012 | Alexander | ......... | B01D 46/2411 55/504 |
| 8,925,510 B2 * | 1/2015 | Stec | ................. | F02M 35/10013 123/184.21 |
| 10,393,076 B1 * | 8/2019 | Freeman | .............. | F02M 35/162 |
| 2007/0095323 A1 * | 5/2007 | Salvisberg | ............ | F02B 27/005 123/184.53 |
| 2008/0190683 A1 * | 8/2008 | Hoeve | ...................... | F02D 29/02 180/229 |
| 2014/0373517 A1 * | 12/2014 | Sweet | ....................... | F28F 9/02 60/324 |
| 2018/0080419 A1 * | 3/2018 | Bringhurst | ............. | F02M 35/04 |

(Continued)

FOREIGN PATENT DOCUMENTS

EP 3382240 A1 * 10/2018 ............ F01D 11/003

*Primary Examiner* — Grant Moubry
(74) *Attorney, Agent, or Firm* — Condo Roccia Koptiw LLP

(57) ABSTRACT

Systems and methods are disclosed for an air intake assembly comprising an airbox defining a plenum for enclosing an air filter, an intake tube attached to the air filter at a first end of the intake tube, the intake tube having a shoulder, and a multi-lipped gasket for detachably connecting the intake tube to the airbox, the multi-lipped gasket comprising a body portion defining a bore for sealingly engaging the intake tube, a lip adjacent the bore for engaging the shoulder of the intake tube, and a pair of distal lips for sealingly engaging the airbox, wherein the airbox, the air filter, and the intake tube are adapted so that air flows into the airbox, through the air filter, through the intake tube, and into a combustion engine (optionally reaching the combustion engine by first passing through a turbocharger and intercooler) of a vehicle.

20 Claims, 9 Drawing Sheets

(56) References Cited

U.S. PATENT DOCUMENTS

| | | | | |
|---|---|---|---|---|
| 2019/0154261 | A1 * | 5/2019 | Yerram | F01D 25/28 |
| 2020/0025162 | A1 * | 1/2020 | Niakan | B01D 46/0012 |
| 2020/0189362 | A1 * | 6/2020 | Williams | F02M 35/0205 |
| 2020/0325921 | A1 * | 10/2020 | Brewer | F16B 5/0241 |
| 2021/0115883 | A1 * | 4/2021 | Flores Corona | F02M 35/02483 |

* cited by examiner

MULTI-LIPPED GASKET FOR AN AIR INTAKE ASSEMBLY

BACKGROUND

Internal combustion engine performance (e.g., in a vehicle) can be improved by aftermarket air (e.g., cold air) intake assemblies, which, for example, supply relatively greater volumes of air to the engine, as compared to a factory air intake system. Benefits of air intake assemblies, for example, include greater horsepower, improved acceleration, reduced pressure drop, obtention of more desirable air-to-fuel ratios, augmented engine sounds, and better filtration.

However, since aftermarket modification is often undertaken by automotive enthusiasts and hobbyists, it is beneficial to create products which facilitate straightforward, positive, installation experiences. It is also beneficial to afford products that perform well and that interact appropriately with the surrounding vehicle environment.

SUMMARY

Systems and methods are disclosed for an air intake assembly comprising an airbox defining a plenum for enclosing an air filter, an intake tube attached to the air filter at a first end of the intake tube, the intake tube having a shoulder, and a multi-lipped gasket for detachably connecting the intake tube to the airbox, the multi-lipped gasket comprising a body portion defining a bore for sealingly engaging the intake tube, a lip adjacent the bore for engaging the shoulder of the intake tube, and a pair of distal lips for sealingly engaging the airbox, wherein the airbox, the air filter, and the intake tube are adapted so that air flows into the airbox, through the air filter, through the intake tube, and into a combustion engine of a vehicle.

Systems and methods are disclosed for connecting an airbox to an intake tube for supplying air to a combustion engine of a vehicle, comprising providing an opening in the airbox having a diameter greater than an air filter, placing a multi-lipped gasket over a distal end of the intake tube until a lip of the multi-lipped gasket engages a shoulder of the intake tube, attaching the air filter to the intake tube distal from the multi-lipped gasket, inserting the air filter into the opening in the airbox, and deforming a first lip of a pair of distal lips of the multi-lipped gasket to insert the first lip into the opening in the airbox, wherein the opening of the airbox is trapped between the pair of distal lips, detachably connecting the intake tube to the airbox.

Systems and methods are disclosed for a multi-lipped gasket for detachably connecting an intake tube to an airbox of an air intake assembly for supplying air to a combustion engine of a vehicle, comprising a body portion defining a bore for sealingly engaging the intake tube, an axial lip adjacent the bore for engaging a shoulder of the intake tube, a hinge body connected to the body portion at a first end of the hinge body, and a pair of distal lips extending from an opposite end of the hinge body for sealingly engaging the airbox, wherein an opening of the airbox is trapped between the pair of distal lips, detachably connecting the intake tube to the airbox via the multi-lipped gasket.

DETAILED DESCRIPTION

Figure 1:
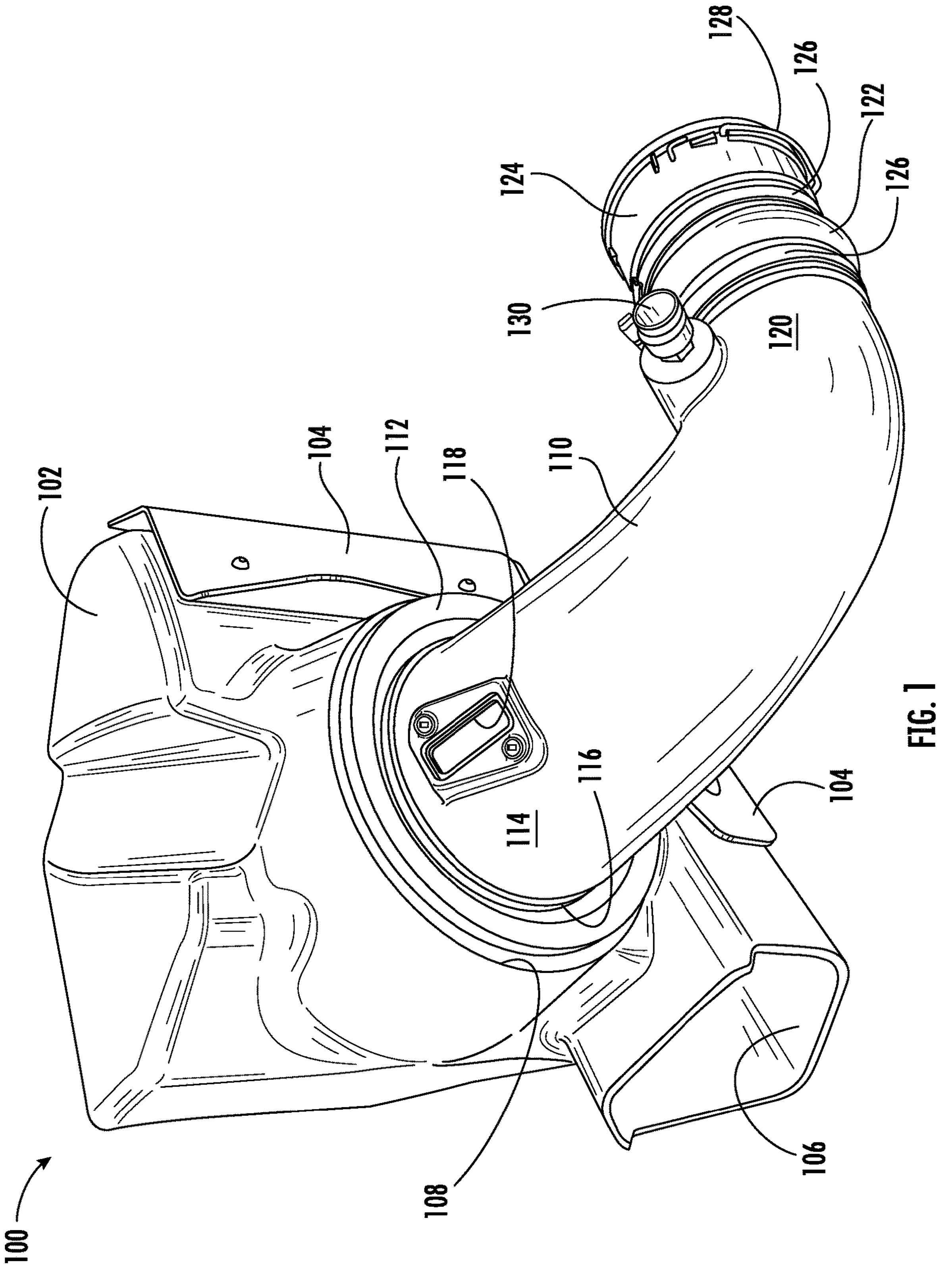
FIG. 1 depicts a top perspective view of an air intake assembly according to one embodiment of the present disclosure.

FIG. 1 depicts an air intake assembly 100. The air intake assembly 100 may be disposed in an engine compartment (or bay) of an internal combustion engine-powered vehicle (not depicted). An airbox 102 houses an air filter (not visible in FIG. 1, but depicted in FIG. 2). The airbox 102 defines a plenum for receiving air flow created by suction from the engine. The airbox 102 may be molded (e.g., rotationally molded) from any suitable material, such as, for example, cross-linked polyethylene. However, the airbox 102 may alternatively be made of injection-molded plastic, molded composite (such as for example carbon fiber/glass fiber), or sheet metal (such as for example mild steel or aluminum). Heat shielding 104 is attached to the airbox to reduce heat buildup on surfaces and the interior of the airbox 102, and otherwise protect from ambient engine bay heat. The heat shielding 104 may comprise aluminum or alloys typically used in vehicles.

The airbox 102 defines at least one opening 106 to allow airflow into the airbox. In some embodiments, a second opening (not depicted) is disposed in the airbox 102. The second opening may be located anywhere on the airbox 102. Preferably, the second opening may be located facing away from the vehicle engine or other heat sources. In one embodiment, the second opening may have an axis approximately ninety degrees to an axis defined by the opening 106. The second opening may be located relatively higher in the airbox 102, for example, as depicted, the opening 106 is toward a bottom of the airbox.

In some embodiments, the airbox 102 does not contain resonators or other sound-dampening features inside the airbox, for example, to improve airflow and/or improve engine sounds. The airbox 102 may include one or more pegs (not depicted) on a bottom surface of the airbox to attach the airbox to the vehicle. For example, the one or more pegs may be machined aluminum pegs secured to the airbox 102 with bolts or other fasteners. The one or more pegs may engage grommets disposed on the vehicle to securely attach the airbox 102 to the vehicle.

The airbox 102 defines another opening 108 large enough to allow insertion of an air filter (not depicted). An intake tube 110 is detachably connected to the airbox 102 via a multi-lipped gasket 112, as will be further explained. The multi-lipped gasket 112 may be rubber or other elastomeric material.

The intake tube 110 is generally hollow and tube-shaped, allowing airflow to be drawn from the airbox 102 through the intake tube. The intake tube 110 may have an axis approximately ninety degrees to an axis defined by the opening 106. The second opening may be located relatively higher in the airbox 102 than the opening 106. The second opening of the airbox 102, if present, may be across the airbox from the intake tube 110.

The intake tube 110 has a first end portion 114 (e.g., air filter side) for engaging the air filter (not depicted) and the multi-lipped gasket 112. As will be better illustrated in FIG. 7, the first end portion 114 of the intake tube 110 includes an annular shoulder 116 defined by a reduction in the diameter of the first end portion, which sealingly engages the multi-lipped gasket 112. Spaced apart from, and distal to the shoulder 116, at least one annular bead (not visible in FIG. 1 or 2) is also disposed on the first end portion 114, as will be described. In some embodiments, the least one annular bead is a pair of beads. The at least one annular bead will be described in more detail with respect to FIG. 7.

A port 118 is disposed on the intake tube 110 in the area of the first end portion 114. The port 118 receives an intake sensor (not depicted). Examples of sensors include sensors for manifold absolute pressure (MAP), temperature manifold absolute pressure (TMAP (sometimes referred to as MAPT)), mass airflow (MAF), air temperature (AT (or IAT)). The port 118 may be configured to receive a first portion of the intake sensor and a second portion of the intake sensor may engage the first portion in a snap fit.

At the other end of the intake tube 110, opposite the first end portion 114, a second end portion 120 (e.g., engine side) is provided. A coupler 122, such as a silicone coupler, is attached to the intake tube 110 at the second end portion 120. The coupler 122 defines a generally cylindrical shape such that air may freely flow from the airbox 102, through the intake tube 110, and through the coupler. The coupler 122 serves to attach the intake tube 110 to a quick connect/disconnect fitting 124. One or more clamps 126 may be provided to secure the coupler to the intake tube 110 and/or the fitting 124. In some embodiments, the clamp(s) 126 may be worm-gear clamps, although other hose clamps are contemplated as well.

With reference to the quick connect/disconnect fitting 124, the coupler 122 allows different types (e.g., geometries) of fitting to be connected to the intake tube 110. The fitting 124 may be aluminum and may not be universal, for example, the fitting may be designed to function with a specific model of vehicle or a specific engine part or a specific model of a specific engine part (e.g., a specific model of turbocharger). The fitting 124 defines a generally cylindrical shape such that air may freely flow from the airbox 102, through the intake tube 110, through the coupler 122, through the fitting, and into the engine (not depicted). By engine, it is meant that a portion of the air reaches the engine for combustion, and the term is used broadly, for example, in operation, the fitting 124 may connect to an intake of a turbocharger (not depicted). Accordingly, the air may pass through a turbocharger, through an intercooler, and then into a combustion engine. The fitting 124 may have one or more spring clips 128 at an end opposite the coupler 122, for example, to facilitate connection to an engine component (not depicted).

A vacuum line fitting 130 is disposed on the intake tube 110 in the area of the second end portion 120. The fitting 130 attaches to a vacuum line (not depicted) which in turn is connected to engine sensors.

Figure 2:
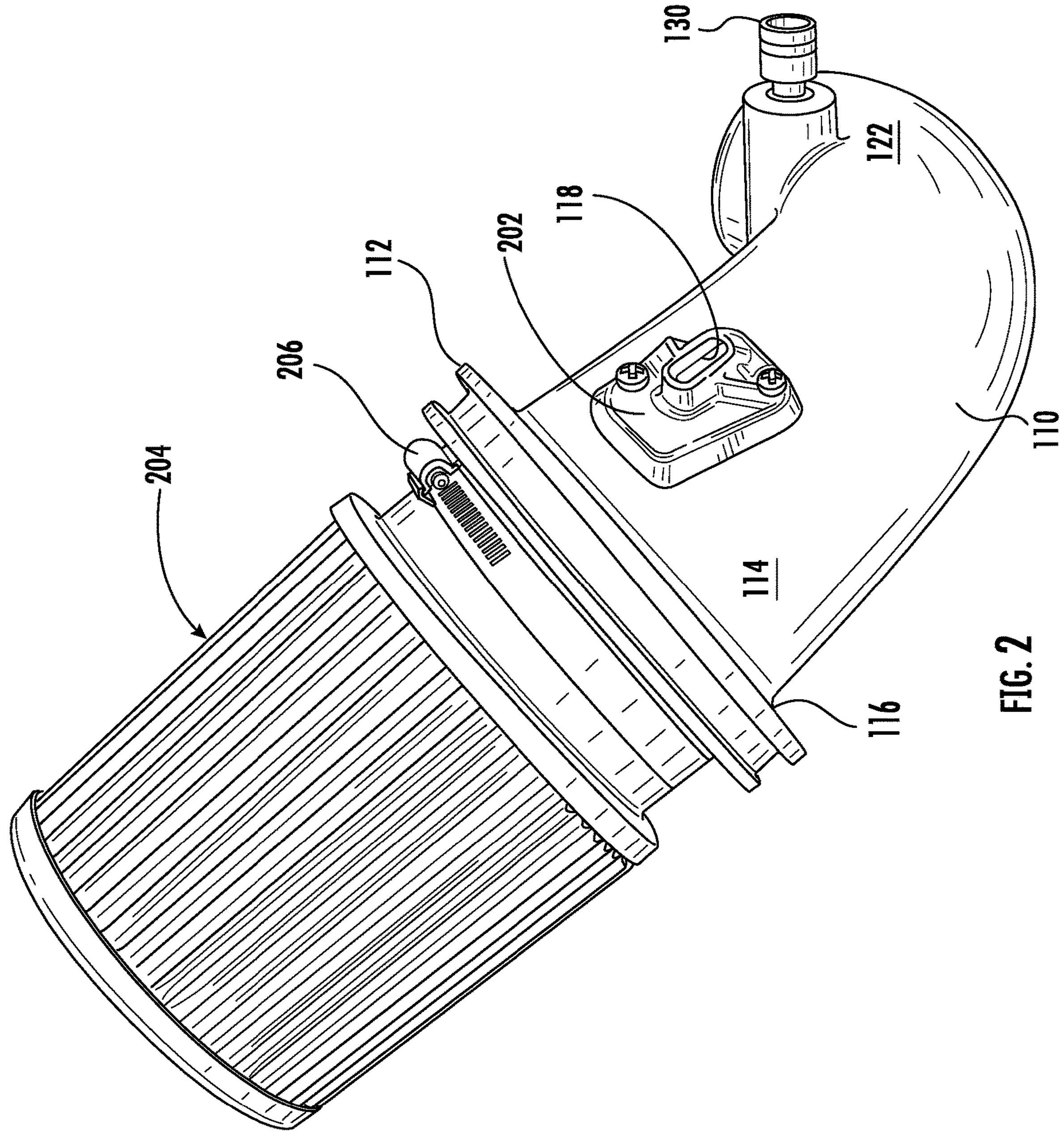
FIG. 2 depicts a perspective view of an air filter attached to a portion of the assembly of FIG. 1.

Turning to FIG. 2, the intake tube 110 and the multi-lipped gasket 112 are depicted with the airbox 102 removed. Components depicted in FIG. 1 and discussed in the accompanying description are given the same reference numerals. A portion 202 of an intake air temperature sensor is attached to the port 118. The portion 202 engages another portion (not depicted) of the intake air temperature sensor, for example, in a snap fit.

An air filter 204 is attached to the intake tube 110. The air filter 204 is generally cylindrical, such that air passes through the filter material and into a plenum which is in fluid communication with the intake tube 110. Preferably, the diameter of the distal end of the first end portion 114 of the intake tube 110 is slightly smaller than a mating distal end of the air filter 204, such that the distal end of the first end portion is slidingly received in the air filter with a tight fit to encourage airflow through the filter material. The air filter 204 may be a high-flow, oiled, air filter.

Optionally, the air filter 204 is secured to the intake tube 110 with a clamp 206. The clamp 206 may be a worm-gear clamp, although other types of clamps are contemplated as well. Alternatively, the air filter 204 may have features, such as a recess, that cooperate with features of the intake tube 110, such as at least one annular bead, in order to snap together. In yet another embodiment, the at least one annular bead acts as a depth stop, engaging a distal portion of the air filter 204 to provide a visual marker for a user indicative of proper assembly.

Figure 3:
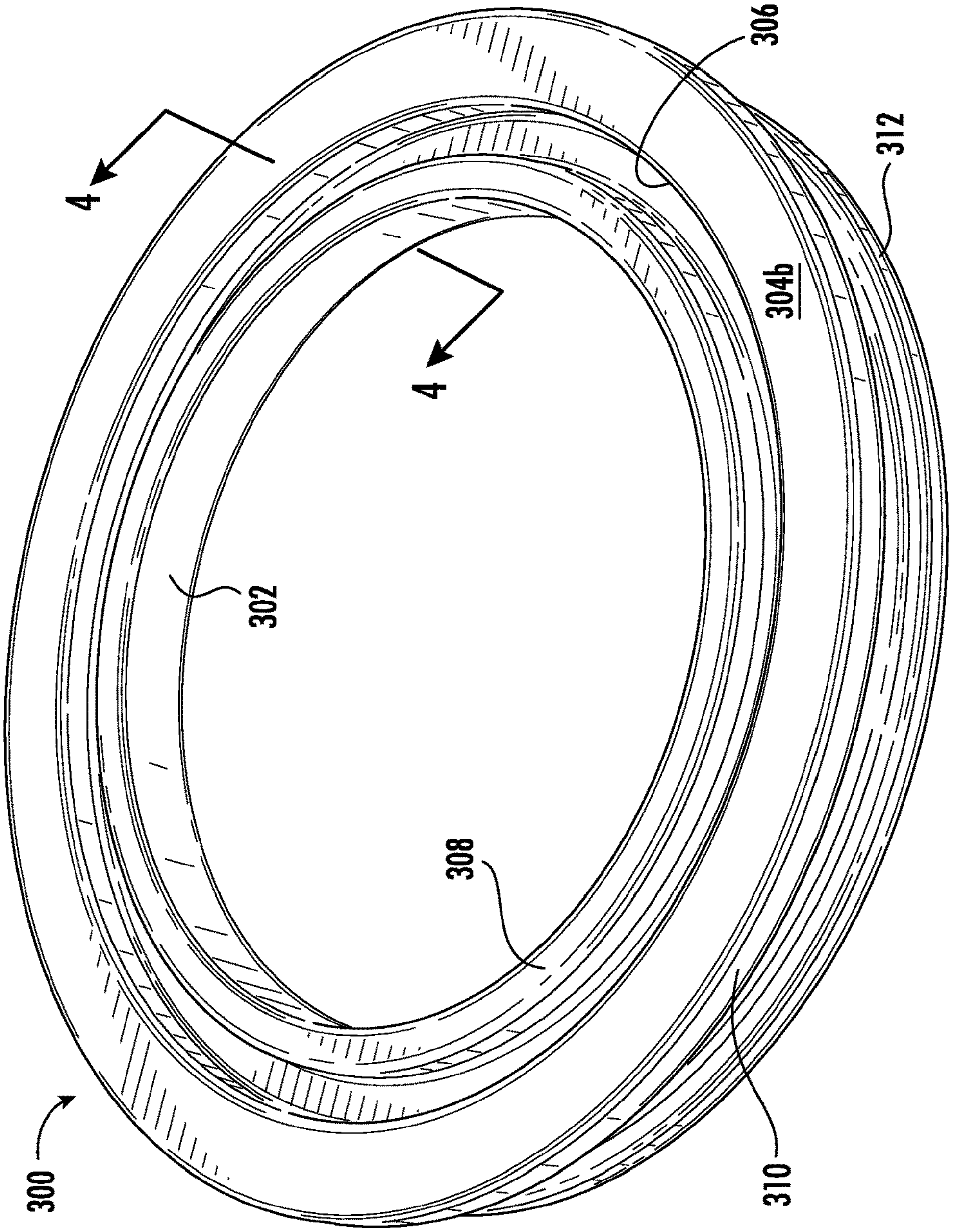
FIG. 3 depicts a top perspective view of multi-lipped gasket according to an embodiment of the present disclosure.

Turning to FIG. 3, a top perspective view of multi-lipped gasket 300 is depicted. The multi-lipped gasket 300 is generally disk-shaped, and "top," in this context is relative to the figure, while in the installation position, the multi-lipped gasket 300 is oriented with the top surface of FIG. 3 facing outward (e.g., away from the air filter). The multi-lipped gasket 300 may be substantially identical to the multi-lipped gasket 112 (FIGS. 1&2).

Figure 4:
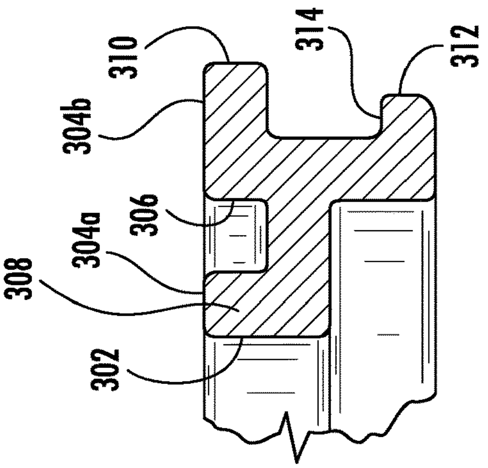
FIG. 4 depicts a sectional view of the multi-lipped gasket of FIG. 3 along a line 4-4.

Referring now to FIGS. 3&4 together, the multi-lipped gasket 300 defines an axial bore 302. The axial bore 302 extends along a first axis about which the remainder of the multi-lipped gasket 300 is radially symmetrical. As will be seen, the top and bottom (e.g., FIG. 5) of the multi-lipped gasket 300 are not symmetrical. Stated differently, a second axis perpendicular to the first axis may be drawn through the multi-lipped gasket 300 and portions of the multi-lipped gasket falling on either side of the second axis are not symmetrical.

Adjacent to the bore 302, a top surface of the multi-lipped gasket 300 is divided into a first top surface **304*a* and a second top surface 304*b* by an axial channel 306. The channel 306 is said to be axial because a depth of the channel (relative to the top surface) is coaxial to the bore 302. The channel 306 as illustrated has a distal wall (e.g., distal with reference to the bore 302), a floor, and a proximal wall. Alternatively, the channel 306** could be replaced by a round-bottomed groove.

The bore 302 and a portion of the top surface **304*a* sealingly engage the intake tube (not depicted) as will be described. The bore 302, the top surface 304*a*, and a portion of the channel 306 cooperate to define an axial lip 308. Accordingly, a portion of the lip 308** sealingly engages the intake tube (not depicted).

The second surface **304*b* forms part of a first radial lip 310. The lip 310 sealingly engages the airbox (not depicted). As can be appreciated from the figures, the widest diameter of the multi-lipped gasket 300 is at the lip 310. Spaced apart from the first radial lip 310 is a second radial lip 312. Lip 310 extends farther from the bore 302 in a radial direction than the lip 312. Lip 312 may be both shorter and/or thinner than the lip 310. A radial channel 314 is disposed between the lip 310 and the lip 312. The channel 314 is said to be radial because a depth of the channel (relative to at least a radially distal surface of the lip 312) is radial to the bore 302. The depth of the channel 314 defines the height of the lip 310 and the height of the lip 312. The channel 314** sealingly engages the airbox (not depicted).

Figure 5:
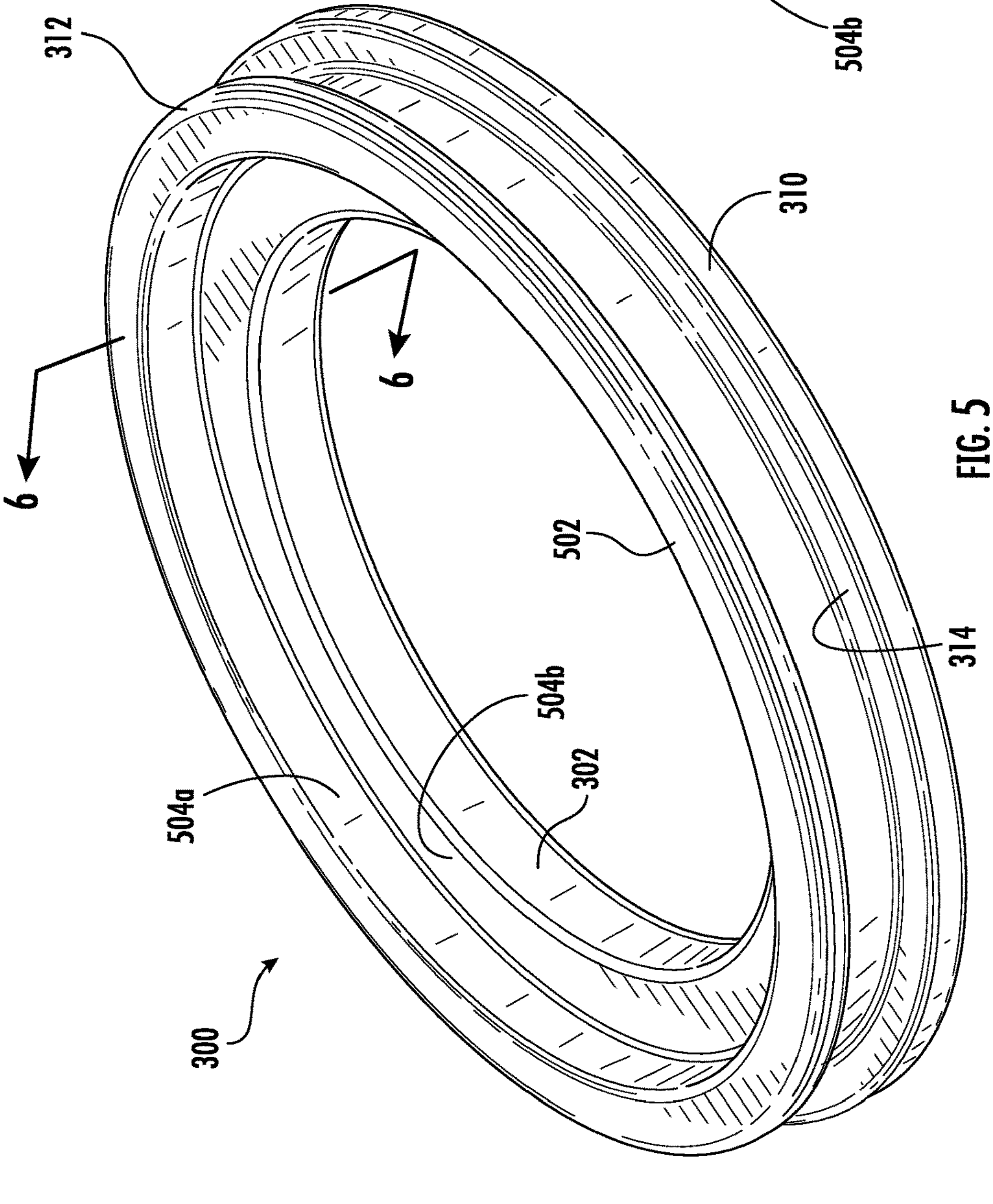
FIG. 5 depicts a bottom perspective view of the multi-lipped gasket of FIG. 3.

Turning to FIG. 5, a bottom perspective view of multi-lipped gasket 300 is depicted. By "bottom," in this context is relative to FIG. 3 (e.g., FIG. 5 illustrates the opposite plane to that illustrated in FIG. 3). In the installation position, the multi-lipped gasket 300 is oriented with the bottom surface of FIG. 5 facing inward (e.g., toward the air filter). For simplicity, components depicted in FIG. 3 and discussed in the accompanying description are given the same reference numerals.

Figure 6:
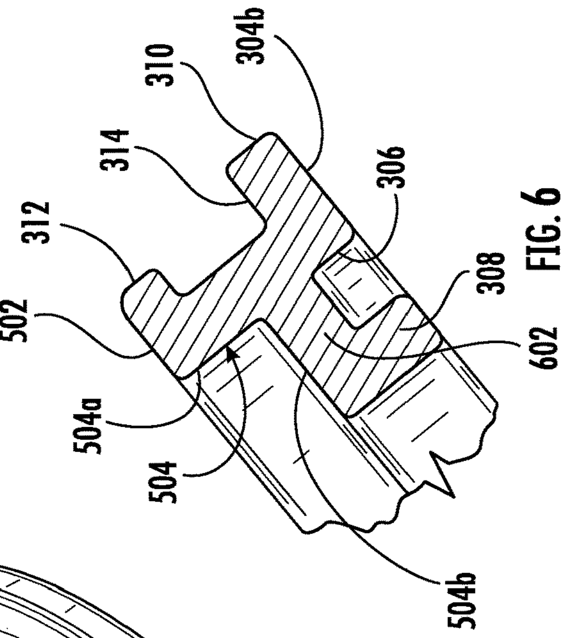
FIG. 6 depicts a sectional view of the multi-lipped gasket of FIG. 5 along a line 6-6.

Referring now to FIGS. 5&6 together, a bottom surface 502 is adjacent to the lip 312. A step 504 is provided in the surface 502. A wall **504*a* of the step 504 is depicted as coaxial to the bore 302 (e.g., perpendicular to the surface 502), however, it is understood that an angle of the wall may vary within the spirit of this disclosure. As depicted, the wall 504*a* and the distal wall of the channel 306 are substantially the same distance from the bore 302. A floor 504*b* of the step is oriented perpendicular to the bore 302 (e.g., parallel to the surface 502**).

Turning now to FIG. 6, it can be seen that the channel 306 and the step 504 leave a strip of material between them which is referred to herein as a hinge body 602. Varying the depth of either the channel 306 and the step 504 affects the thickness of the hinge body 602. Varying the width of the channel 306 affects the height of the hinge body 602, as well as, in some cases, the thickness of the lip 308. Varying the width of the step 504 also affects the height of the hinge body 602. The hinge body 602 mechanically connects the intake tube (not depicted) to the airbox (also not depicted) with a degree of elasticity. Some elasticity of the hinge body 602 is desirable, as the airbox is connected to the vehicle frame and the intake tube is connected (e.g., indirectly) to the engine, and thus may experience movement relative to each other and/or vibration. In such cases, elasticity of the hinge body 602 allows the airbox and the intake tube to move semi-independently, while retaining a seal.

Figure 7:
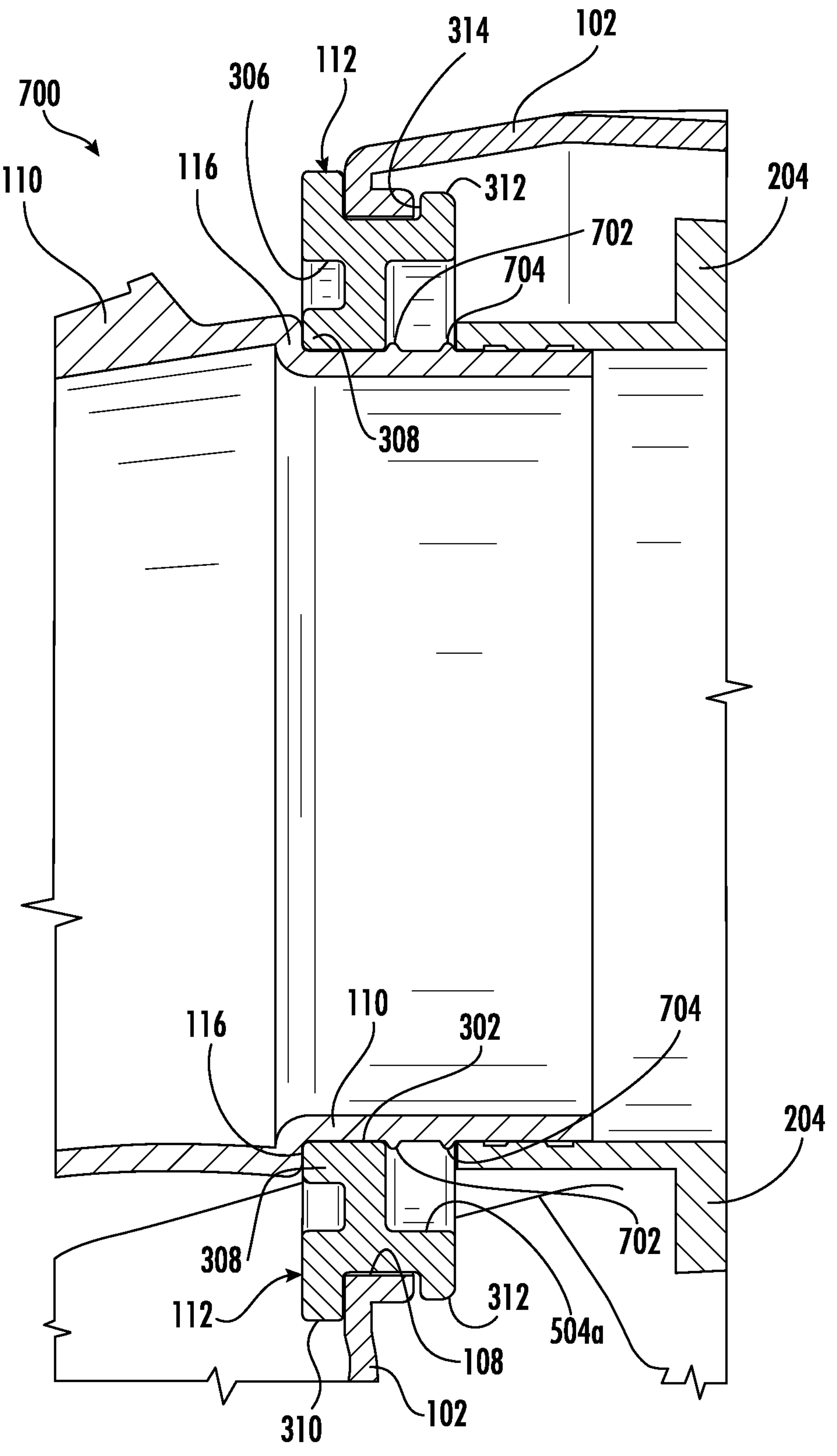
FIG. 7 depicts an enlarged sectional view of a portion of an air intake assembly similar to that of FIG. 1.

Turning to FIG. 7, a section of an air intake assembly 700 is depicted in an assembled state. As noted, the airbox 102 defines a plenum for enclosing the air filter 204 (optional clamp not depicted). The intake tube 110 is attached to the air filter 204. As can be appreciated, the multi-lipped gasket 112 is interposed between the airbox 102 and the intake tube 110, detachably connecting the intake tube to the airbox. The reference number 112 is used with respect to the multi-lipped gasket, but the description applies equally to multi-lipped gaskets 300, 900, and 1200, mutatis mutandis. In fact, features described with respect to the multi-lipped gasket 300 are given the same reference numerals in this figure.

The radial channel 314 of the multi-lipped gasket 112 (disposed between the lip 310 and the lip 312) engages the airbox 102. The bore 302 of the multi-lipped gasket 112 engages the intake tube 110. Elasticity of the multi-lipped gasket 112 allows the airbox and the intake tube to move semi-independently, while retaining a seal with respect to the airbox and the multi-lipped gasket and the multi-lipped gasket and the intake tube.

The intake tube 110 has a shoulder 116. The axial lip 308 of the multi-lipped gasket 112 engages the shoulder 116 of the intake tube 110. Spaced apart from, and distal to the shoulder 116, the intake tube 110 has a first annular bead 702 and spaced apart from the first annular bead, a second annular bead 704. The multi-lipped gasket 112 also engages the first annular bead 702, potentially compressing the multi-lipped gasket and improving the seal between the multi-lipped gasket and the intake tube 110.

The second annular bead 704 may act as a depth stop, preventing the air filter 204 from being inserted too far over the intake tube 110 and/or as a visual aid to connote proper installation (e.g., that the air filter is sufficiently inserted over the intake tube).

In operation, the multi-lipped gasket 112 is placed over the distal end of the intake tube 110 and pulled onto the intake tube until the axial lip 308 of the multi-lipped gasket engages the shoulder 116 of the intake tube. As noted above, a side of the multi-lipped gasket 112 opposite the axial lip also engages the first annular bead 702. The air filter 204 is placed over the distal end of the intake tube 110 and pulled onto the intake tube until the air filter engages the second annular bead 704. The air filter 204 may be clamped in place, such as with a worm-gear clamp (not depicted). Next, the air filter 204 (now connected to the intake tube 110) is inserted through the opening 108 of the airbox 102 so that the entire air filter is inside the airbox.

It is understood that a diameter of the multi-lipped gasket 112 at the lip 312 is greater than a diameter of the opening 108. A diameter of the multi-lipped gasket 112 at the radial channel 314 is approximately the same as the diameter of the opening 108 (for example, in some embodiments, slightly smaller). A portion of the lip 312 of the multi-lipped gasket 112 is deformed and inserted through the opening 108 of the airbox 102. In some embodiments, the hinge body 602 provides the necessary elasticity for the lip 312 to sufficiently bend. The lip 312 may have a relieved corner to facilitate insertion. Once the portion of the lip 312 is inserted through the opening 108 of the airbox 102, then, an adjacent portion of the lip is deformed and inserted through the opening, and so forth, until the entire lip is disposed inside the airbox.

It is noted that a diameter of the multi-lipped gasket 112 at the lip 310 is greater than a diameter of the opening 108 (and the diameter of the lip 312). The lip 312 may be sufficiently large and or stiff that the lip cannot enter the airbox 102. Accordingly, the multi-lipped gasket 112 provides a tool-less, detachable connection between the intake tube 110 and the airbox 102. However, the geometry of the channel 314 is such that accidental dislodging of the multi-lipped gasket 112 from the airbox 102 (and hence accidental dislodging of the air filter 204 from the airbox) is prevented. The airbox 102, the air filter 204, and the intake tube 110 are adapted so that air flows into the airbox, through the air filter, through the intake tube, and into a combustion engine of a vehicle.

Figure 8:
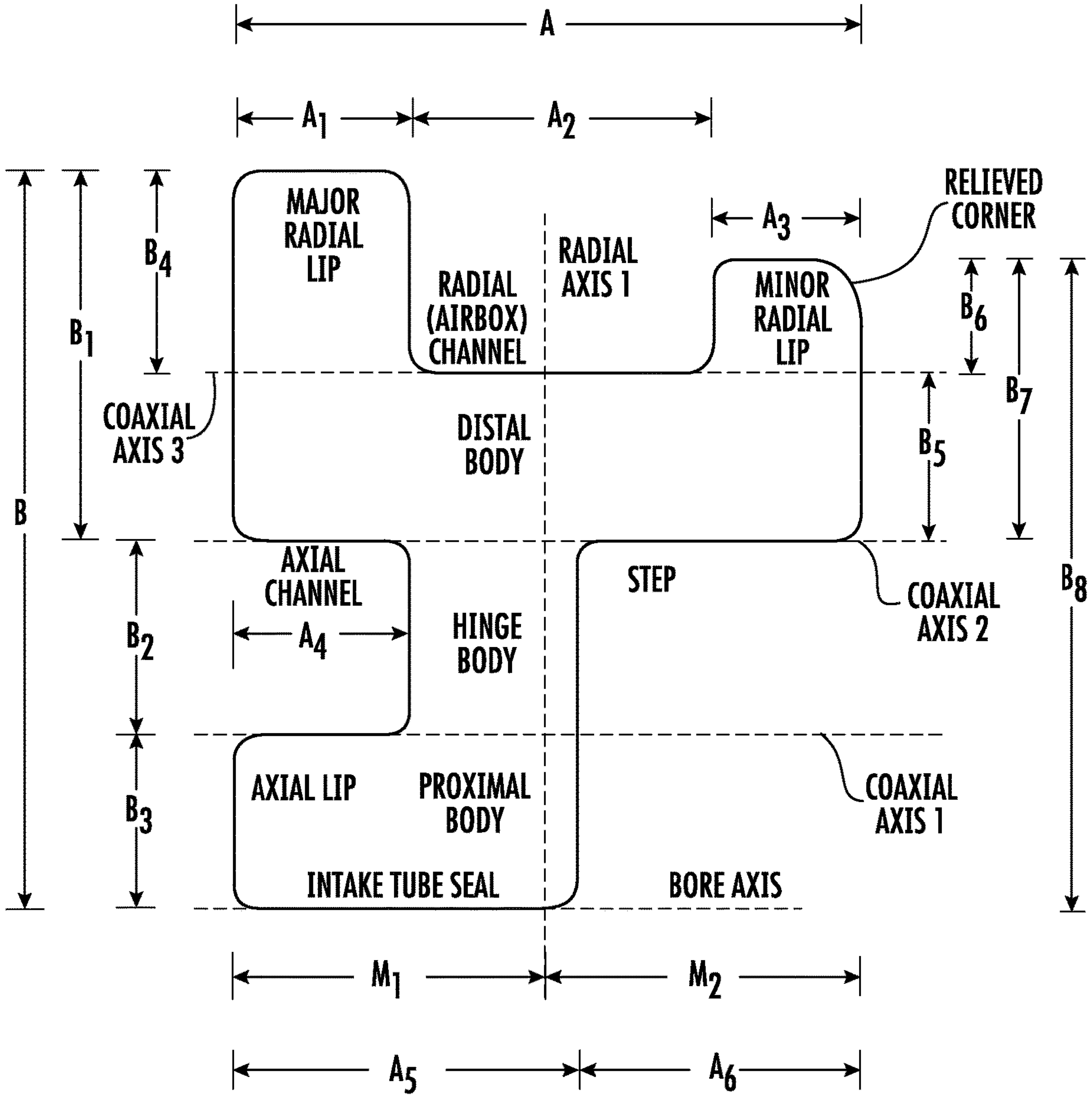
FIG. 8 depicts a schematic view of a section of a multi-lipped gasket according to an embodiment of the present disclosure.

Turning to FIG. 8, a schematic view of a section of a multi-lipped gasket is shown. The multi-lipped gasket comprises features previously described herein, such as an axial lip, an axial channel, a hinge body, a step, and a pair of radial lips separated by a radial channel. The relatively larger lip is labeled the major radial lip. The relatively smaller lip is labeled the minor radial lip. The minor radial lip may be both thinner and shorter. In some embodiments, this may facilitate insertion of the minor radial lip into the airbox (not depicted). Optionally, the minor radial lip has a relieved corner to facilitate insertion into the airbox.

As can be appreciated, the bore defines an axis ("bore axis" in FIG. 8). With respect to the bore axis, first, second, and third coaxial axes are depicted. Perpendicular to these axes, a first radial axis is shown.

By way of describing certain features, it can be seen that the axial lip protrudes from a proximal body adjacent the bore, the hinge body is adjacent to the proximal body, and a distal body (from which the pair of radial lips protrude), is adjacent to the hinge body. These three bodies are actually areas (or regions) of the multi-lipped gasket, and, for that matter, so are the lips. Stated differently, the multi-lipped gasket is a one-piece article molded to the depicted shape.

The radial axis 1 divides the section into two unsymmetrical halves, e.g., the halves represented by distances $M_1$ and $M_2$ are approximately the same. The axial lip, a relatively larger portion of the hinge body (e.g., greater than 60%, greater than 75%, greater than 80%, greater than 85%, greater than 90%, of the hinge body is disposed on the first unsymmetrical half), and the major radial lip are all disposed on the first unsymmetrical half. The step and the minor radial lip are disposed on the second unsymmetrical half. In another embodiment, the axial lip, a relatively even portion of the hinge body (e.g., greater than 45%, about 50%, greater than 50%, greater than 55%, less than 60%, of the hinge body is disposed on the first unsymmetrical half), and the major radial lip are all disposed on the first unsymmetrical half. The step and the minor radial lip are disposed on the second unsymmetrical half.

The multi-lipped gasket has an axial distance A. Various features are described herein by axial distances and their relationships thereto. For example, the major radial lip has a distance $A_1$, which is the thickness of that lip. The radial channel (which receives the airbox) has a distance $A_2$, which is the width of the channel. The minor radial lip has a distance $A_3$, which is the thickness of that lip. The sum of the three distances is A. In some embodiments, $A_1$ is greater than $A_3$. The axial channel has a distance $A_4$, which is the depth of the channel. The axial lip also protrudes the distance $A_4$. In some embodiments, $A_1=A_4$. The axial lip and proximal body together have a distance $A_5$, which is approximately the length of the intake tube seal. In some embodiments, $A_5$ is greater than $M_1$. The step has a distance $A_6$, which is the depth of the step. In some embodiments, $A_6$ is less than $M_2$. The sum of $A_5$ and $A_6$ is A. A thickness of the hinge body can be determined by $A-(A_4+A_6)$.

The multi-lipped gasket has a radial distance B. The distal end of the major radial lip to a nearest edge of the axial channel (e.g., to coaxial axis 2) has a distance $B_1$. The axial channel has a distance $B_2$, which is the width of the channel (e.g., from coaxial axis 1 to coaxial axis 2). The axial lip has a distance $B_3$ (e.g., from the bore axis to coaxial axis 1), which is the thickness of that lip. The sum of the three distances is B. The major radial lip has a distance Ba, which is the protrusion of that lip. The distal body has a distance $B_5$ (e.g., from coaxial axis 2 to coaxial axis 3), which is equal to $B_1$ minus Ba. The minor radial lip has a distance $B_6$, which is the protrusion of that lip. For reference, $B_6$ is less than Ba. Accordingly, a distance $B_7$ is less than $B_1$. Similarly, a distance $B_6$ is less than B.

Certain relationships may be beneficial, for example, $A_1$ may be equal to $B_3$ (such that the major radial lip and the axial lip are the same thickness) and less than Ba (such that major radial lip is longer than it is wide). $A_3$ may be greater than $B_6$ (such that minor radial lip is shorter than it is wide). $A_4$ may be less than $B_2$. The hinge body may be equal in axial width to the distance $B_5$ (e.g., radially).

Figure 9:
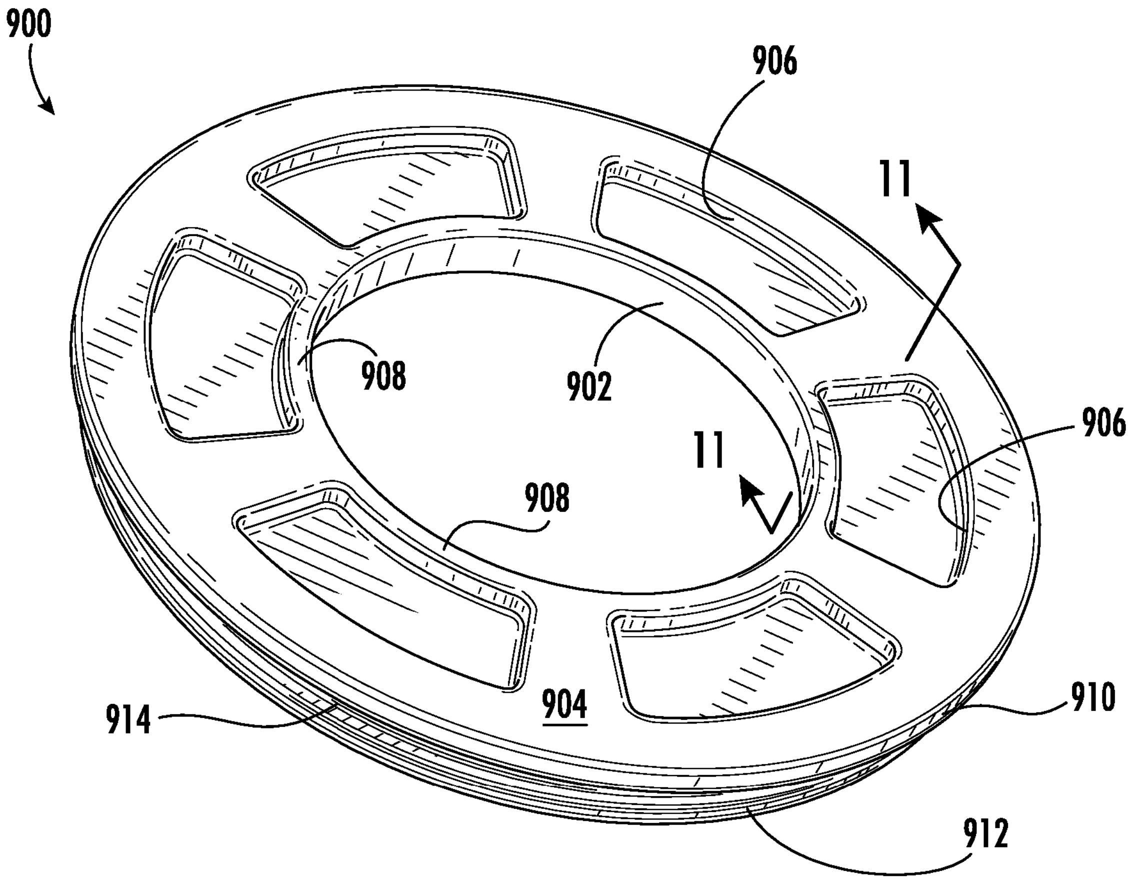
FIG. 9 depicts a top perspective view of a multi-lipped gasket according to an embodiment of the present disclosure.

Turning to FIG. 9, a top perspective view of a multi-lipped gasket 900 is depicted. The multi-lipped gasket 900 is generally disk-shaped, and "top," in this context is relative to the figure, while in the installation position, the multi-lipped gasket 900 is oriented with the top surface of FIG. 9 facing outward (e.g., away from the air filter). The multi-lipped gasket 900 may be substantially identical to the multi-lipped gasket 112 (FIGS. 1&2).

The multi-lipped gasket 900 defines an axial bore 902. The axial bore 902 extends along a first axis about which the remainder of the multi-lipped gasket 900 is radially symmetrical. As will be seen, the top and bottom (e.g., FIG. 10) of the multi-lipped gasket 900 are not symmetrical. Stated differently, a second axis perpendicular to the first axis may be drawn through the multi-lipped gasket 900 and portions of the multi-lipped gasket falling on either side of the second axis are not symmetrical (best seen in FIG. 11).

A top surface 904 of the multi-lipped gasket 900 has a plurality of recesses 906. The plurality of recesses 906 have a depth relative to the top surface 904 that is coaxial to the bore 902. The plurality of recesses 906 have distal walls (e.g., distal with reference to the bore 902), radial walls, proximal walls, and respective floors. The bore 902 and a portion of the top surface 904 sealingly engage the intake tube (not depicted) in a manner described in FIG. 7. The bore 902, the top surface 904, and a proximal wall portion of the plurality of recesses 906 cooperate to define an axial lip 908. Accordingly, a portion of the lip 908 sealingly engages the intake tube (not depicted).

An outer portion of the top surface 904 forms part of a first radial lip 910. The lip 910 sealingly engages the airbox (not depicted). As can be appreciated from the figures, the widest diameter of the multi-lipped gasket 900 is at the lip 910. Spaced apart from the first radial lip 910 is a second radial lip 912. Lip 910 extends farther from the bore 902 in a radial direction than the lip 912. Lip 912 may be both shorter and/or thinner than the lip 910. A radial channel 914 is disposed between the lip 910 and the lip 912. The channel 914 is said to be radial because a depth of the channel (relative to at least a radially distal surface of the lip 912) is radial to the bore 902. The depth of the channel 914 defines the height of the lip 910 and the height of the lip 912. The channel 914 sealingly engages the airbox (not depicted).

Figure 10:
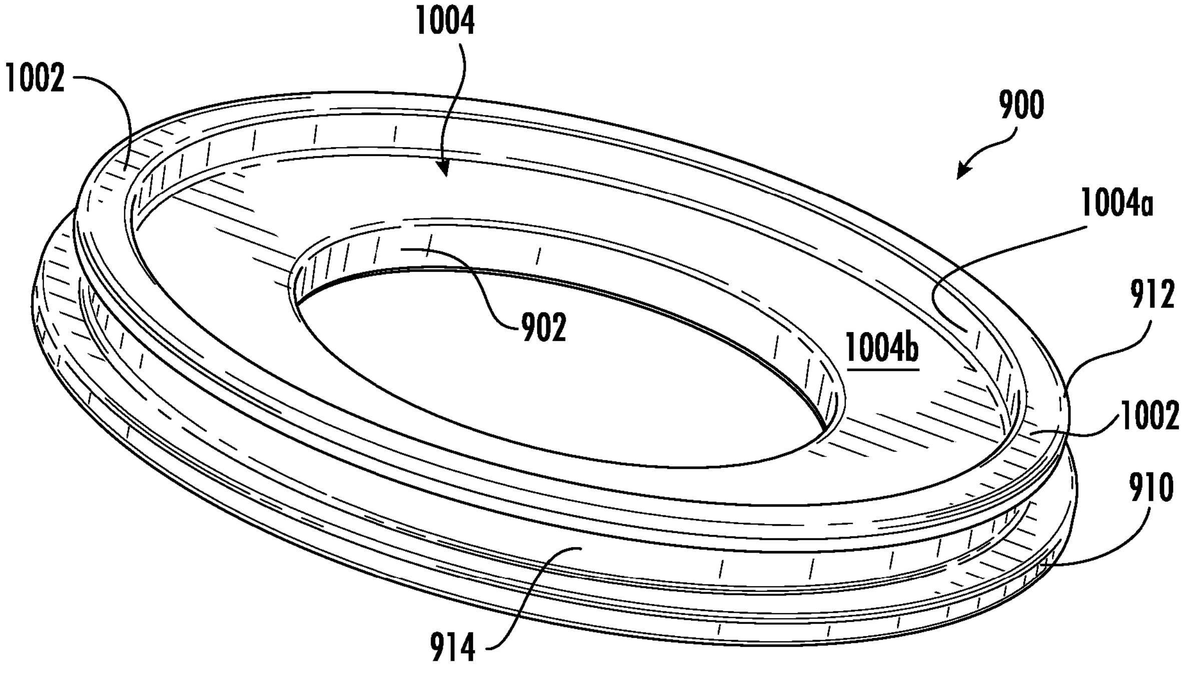
FIG. 10 depicts a bottom perspective view of the multi-lipped gasket of FIG. 9.

Turning to FIG. 10, a bottom perspective view of multi-lipped gasket 900 is depicted. By "bottom," in this context is relative to FIG. 9 (e.g., FIG. 10 illustrates the opposite plane to that illustrated in FIG. 9). In the installation position, the multi-lipped gasket 900 is oriented with the bottom surface of FIG. 10 facing inward (e.g., toward the air filter). For simplicity, components depicted in FIG. 9 and discussed in the accompanying description are given the same reference numerals in FIGS. 10 and 11.

A bottom surface 1002 is adjacent to the lip 912. A step 1004 is provided in the surface 1002. A wall 1004*a* of the step 1004 is depicted as coaxial to the bore 902 (e.g., perpendicular to the surface 1002), however, it is understood that an angle of the wall may vary within the spirit of this disclosure. As depicted, the wall 1004*a* and the distal walls of the plurality of recesses 906 are substantially the same distance from the bore 902. A floor 1004*b* of the step is oriented perpendicular to the bore 902 (e.g., parallel to the surface 1002).

Figure 11:
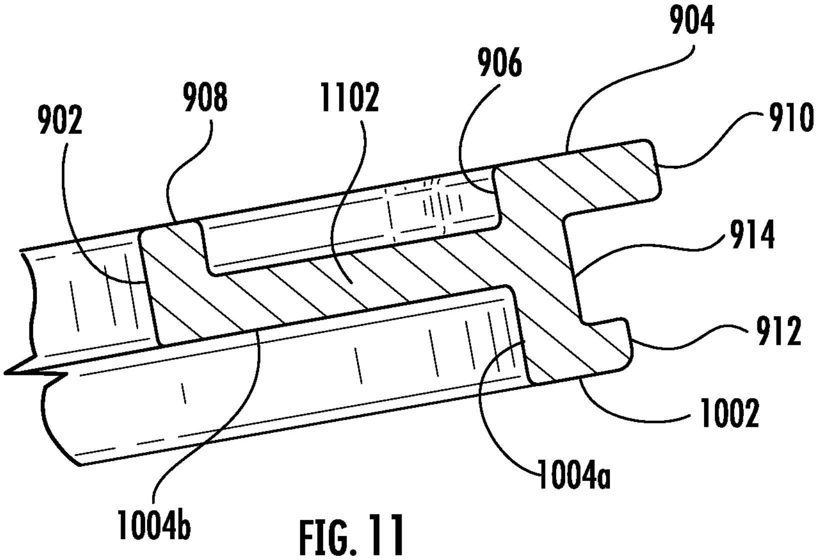
FIG. 11 depicts a sectional view of the multi-lipped gasket of FIG. 9 along a line 11-11.

Turning now to FIG. 11, it can be seen that the plurality of recesses 906 and the step 1004 leave a strip of material between them which is referred to herein as a hinge body 1102. Varying the depth of either the plurality of recesses 906 and the step 1004 affects the thickness of the hinge body 1102. Varying the width of the plurality of recesses 906 affects the height of the hinge body 1102, as well as, in some cases, the thickness of the lip 908. Varying the width of the step 1004 also affects the height of the hinge body 1102. The hinge body 1102 mechanically connects the intake tube (not depicted) to the airbox (also not depicted) with a degree of elasticity. Some elasticity of the hinge body 1102 is desirable, as the airbox is connected to the vehicle frame and the intake tube is connected (e.g., indirectly) to the engine, and thus may experience movement relative to each other and/or vibration. In such cases, elasticity of the hinge body 1102 allows the airbox and the intake tube to move semi-independently, while retaining a seal.

Figure 12:
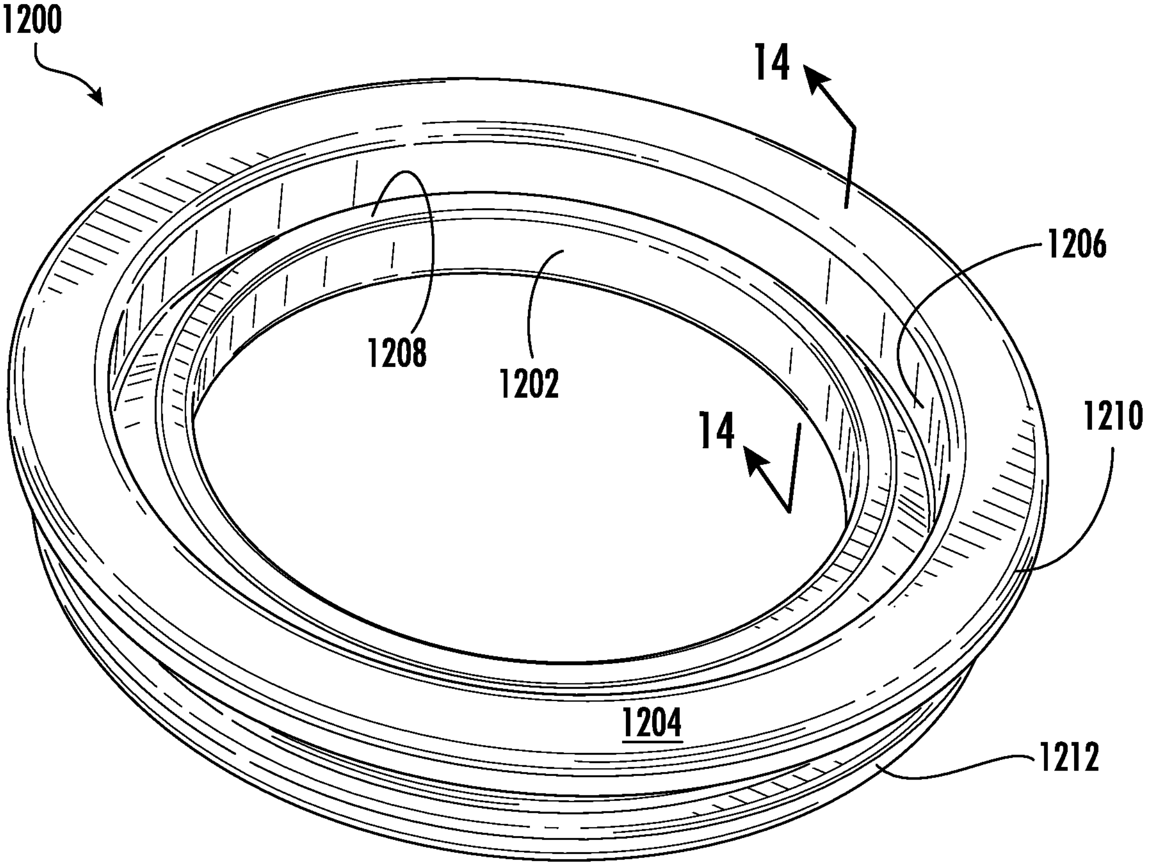
FIG. 12 depicts a top perspective view of a multi-lipped gasket according to an embodiment of the present disclosure.

Turning to FIG. 12, a top perspective view of multi-lipped gasket 1200 is depicted. The multi-lipped gasket 1200 is generally disk-shaped, and "top," in this context is relative to the figure, while in the installation position, the multi-lipped gasket 1200 is oriented with the top surface of FIG. 12 facing outward (e.g., away from the air filter). The multi-lipped gasket 1200 may be substantially identical to the multi-lipped gasket 112 (FIGS. 1&2).

The multi-lipped gasket 1200 defines an axial bore 1202. The axial bore 1202 extends along a first axis about which the remainder of the multi-lipped gasket 1200 is radially symmetrical. As will be seen, the top and bottom (e.g., FIG. 13) of the multi-lipped gasket 1200 are not symmetrical. Stated differently, a second axis perpendicular to the first axis may be drawn through the multi-lipped gasket 1200 and portions of the multi-lipped gasket falling on either side of the second axis are not symmetrical (best seen in FIG. 14).

A top surface 1204 of the multi-lipped gasket 1200 has a groove 1206. The groove 1206 has a depth relative to the top surface 1204 that is coaxial to the bore 1202. The groove 1206 has a relatively coaxial distal wall (e.g., distal with reference to the bore 1202) and sloping proximal wall. Between the bore 1202 and the groove 1206, an axial lip 1208 is defined. The bore 1202 and a portion of the lip 1208 sealingly engage the intake tube (not depicted) in a manner described in FIG. 7.

An outer portion of the top surface 1204 forms part of a first radial lip 1210. The lip 1210 sealingly engages the airbox (not depicted). As can be appreciated from the figures, the widest diameter of the multi-lipped gasket 1200 is at the lip 1210. Spaced apart from the first radial lip 1210 is a second radial lip 1212. Lip 1210 extends farther from the bore 1202 in a radial direction than the lip 1212. Lip 1212 may be both shorter and/or thinner than the lip 1210. A radial channel 1214 is disposed between the lip 1210 and the lip 1212. The channel 1214 is said to be radial because a depth of the channel (relative to at least a radially distal surface of the lip 1212) is radial to the bore 1202. The depth of the channel 1214 defines the height of the lip 1210 and the height of the lip 1212. The channel 1214 sealingly engages the airbox (not depicted).

Figure 13:
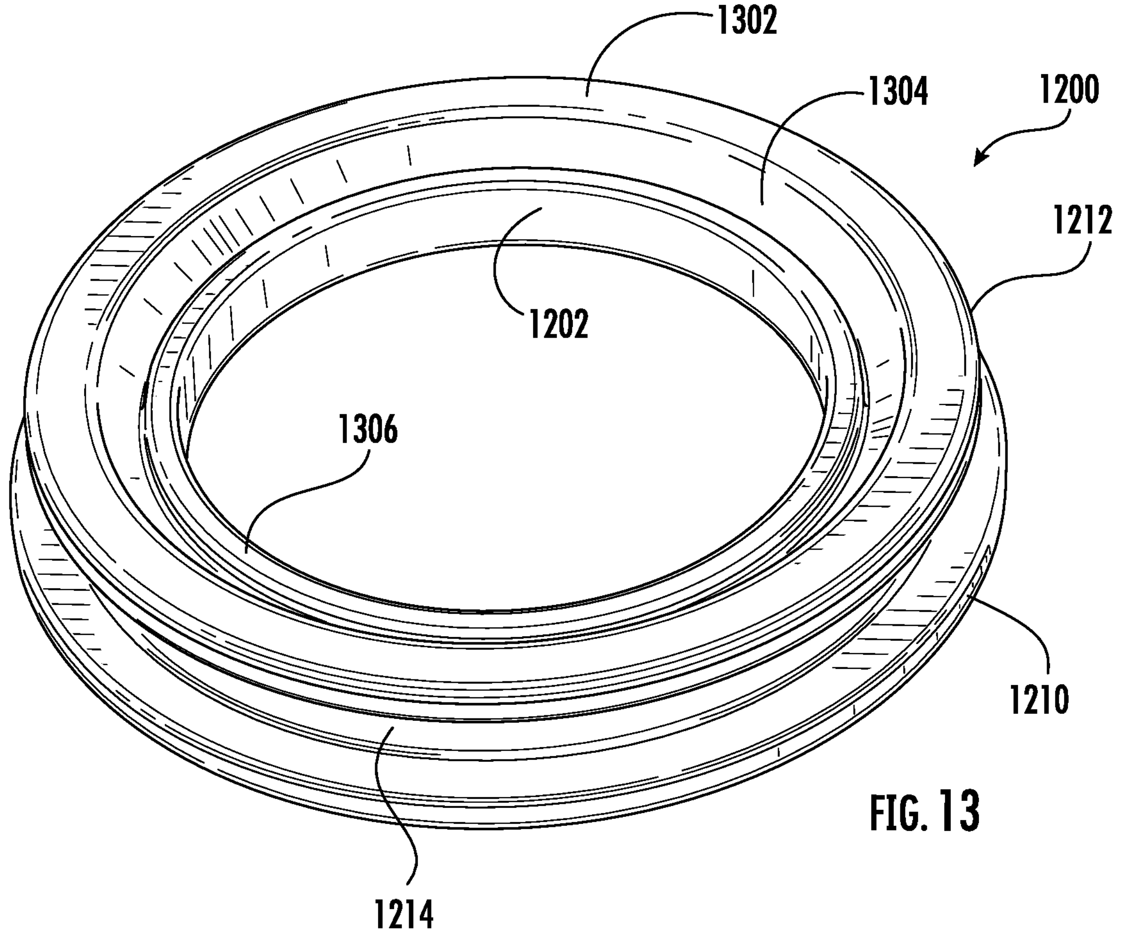
FIG. 13 depicts a bottom perspective view of the multi-lipped gasket of FIG. 12.

Turning to FIG. 13, a bottom perspective view of multi-lipped gasket 1200 is depicted. By "bottom," in this context is relative to FIG. 12 (e.g., FIG. 13 illustrates the opposite plane to that illustrated in FIG. 12). In the installation position, the multi-lipped gasket 1200 is oriented with the bottom surface of FIG. 13 facing inward (e.g., toward the air filter). For simplicity, components depicted in FIG. 12 and discussed in the accompanying description are given the same reference numerals in FIGS. 13 and 11.

A bottom surface 1302 is adjacent to the lip 1212. A groove 1304 is provided in the surface 1302. A proximal wall of the groove 1304 is depicted as coaxial to the bore 1202 (e.g., perpendicular to the surface 1302), however, it is understood that an angle of the wall may vary within the spirit of this disclosure. A sloping wall of the groove 1304 runs parallel to sloping proximal wall of the groove 1206. A lip 1306 is disposed between the bore 1202 and the groove 1206. The lip 1306 is oriented perpendicular to the bore 1202 (e.g., parallel to the surface 1302), and may engage the first annular bead (not depicted).

Figure 14:
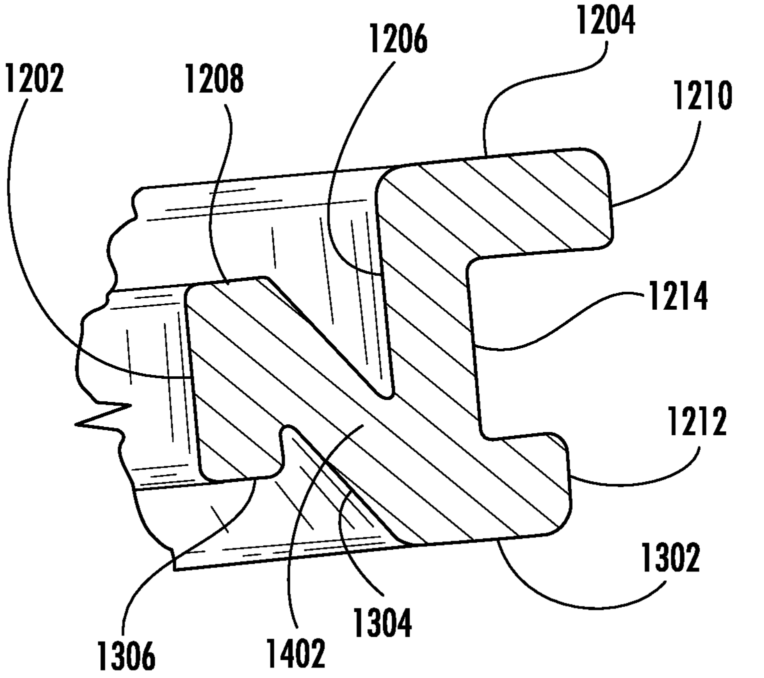
FIG. 14 depicts a sectional view of the multi-lipped gasket of FIG. 12 along a line 14-14.

Turning now to FIG. 14, it can be seen that the groove 1206 and the groove 1304 leave a strip of material between them which is referred to herein as a hinge body 1402. The hinge body 1402 is respectively shorter than previously described embodiments. Hinge body 1402 is also oriented at an angle other then perpendicular to the bore 1202. Varying the depth of either the groove 1206 and the groove 1304 affects the thickness of the hinge body 1402. Varying the width of the groove 1206 affects the height of the hinge body 1402, as well as, in some cases, the thickness of the lip 1306. Varying the width of the groove 1304 also affects the height of the hinge body 1402. The hinge body 1402 mechanically connects the intake tube (not depicted) to the airbox (also not depicted) with a degree of elasticity. Some elasticity of the hinge body 1402 is desirable, as the airbox is connected to the vehicle frame and the intake tube is connected (e.g., indirectly) to the engine, and thus may experience movement relative to each other and/or vibration. In such cases, elasticity of the hinge body 1402 allows the airbox and the intake tube to move semi-independently, while retaining a seal.

The invention claimed is:

1. An air intake assembly comprising:
- an airbox defining a plenum for enclosing an air filter;
- an intake tube attached to the air filter at a first end of the intake tube, the intake tube having a shoulder; and
- a multi-lipped gasket for detachably connecting the intake tube to the airbox, the multi-lipped gasket comprising a body portion defining a bore for sealingly engaging the intake tube, a lip adjacent to the bore for engaging the shoulder of the intake tube, and a pair of distal lips for sealingly engaging the airbox;
- wherein the airbox, the air filter, and the intake tube are adapted so that air flows into the airbox, through the air filter, through the intake tube, and into a combustion engine of a vehicle.

2. The air intake assembly of claim 1, further comprising a coupler attached to the intake tube air filter at a second end of the intake tube, wherein air flows into the airbox, through the air filter, through the intake tube, through the coupler, and into the combustion engine.

3. The air intake assembly of claim 2, further comprising a quick connect/disconnect fitting attached to the coupler, wherein air flows into the airbox, through the air filter, through the intake tube, through the coupler, through the fitting, and into the combustion engine.

4. The air intake assembly of claim 1, wherein the multi-lipped gasket further comprises a hinge body disposed between the lip and the pair of distal lips.

5. The air intake assembly of claim 4, wherein a thickness of the hinge body is defined between grooves on either side of the multi-lipped gasket.

6. The air intake assembly of claim 5, wherein one of the grooves is a step on an air filter side of the multi-lipped gasket.

7. The air intake assembly of claim 5, wherein one of the grooves is a channel on an intake tube shoulder side of the multi-lipped gasket.

8. The air intake assembly of claim 1, wherein the pair of distal lips are of different lengths.

9. The air intake assembly of claim 8, wherein a first lip of the pair of distal lips is longer, and engages an outer surface of the airbox.

10. The air intake assembly of claim 1, wherein the intake tube further comprises at least one annular bead spaced apart from the shoulder.

11. A method of connecting an airbox to an intake tube for supplying air to a combustion engine of a vehicle, comprising:

providing an opening in the airbox having a diameter greater than an air filter;

placing a multi-lipped gasket over a distal end of the intake tube until a lip of the multi-lipped gasket engages a shoulder of the intake tube;

attaching the air filter to the intake tube distal from the multi-lipped gasket;

inserting the air filter into the opening in the airbox; and deforming a first lip of a pair of distal lips of the multi-lipped gasket to insert the first lip into the opening in the airbox, wherein the opening of the airbox is trapped between the pair of distal lips, detachably connecting the intake tube to the airbox.

12. The method of claim 11, further comprising providing at least one annular bead on the intake tube spaced apart from the shoulder, wherein the at least one annular bead abuts the air filter.

13. The method of claim 12, further comprising providing a second annular bead on the intake tube between the shoulder and the at least one annular bead, wherein the second annular bead abuts the multi-lipped gasket.

14. A multi-lipped gasket for detachably connecting an intake tube to an airbox of an air intake assembly for supplying air to a combustion engine of a vehicle, comprising:

a body portion defining a bore for sealingly engaging the intake tube;

an axial lip adjacent the bore for engaging a shoulder of the intake tube;

a hinge body connected to the body portion at a first end of the hinge body; and a pair of distal lips extending from an opposite end of the hinge body for sealingly engaging the airbox, wherein an opening of the airbox is trapped between the pair of distal lips, detachably connecting the intake tube to the airbox via the multi-lipped gasket.

15. The multi-lipped gasket of claim 14, wherein a thickness of the hinge body is defined between grooves on either side of the multi-lipped gasket.

16. The multi-lipped gasket of claim 15, wherein one of the grooves is a step on an inner side of the multi-lipped gasket.

17. The multi-lipped gasket of claim 15, wherein one of the grooves is a channel on an outer side of the multi-lipped gasket.

18. The multi-lipped gasket of claim 14, wherein the pair of distal lips are of different lengths.

19. The multi-lipped gasket of claim 14, wherein a first lip of the pair of distal lips is longer, and engages an outer surface of the airbox.

20. The multi-lipped gasket of claim 19, wherein a second lip of the pair of distal lips is shorter, and is adapted to be inserted into the opening of the airbox and engage an inner surface of the airbox.

* * * * *